United States Patent
Gough et al.

(10) Patent No.: US 8,595,261 B1
(45) Date of Patent: Nov. 26, 2013

(54) METHOD AND APPARATUS FOR THE PRODUCTION, DELIVERY, AND RECEIPT OF AUDIOVISUAL E-MAIL

(76) Inventors: Michael L. Gough, Ben Lomond, CA (US); James J. Gough, Ben Lomond, CA (US); Paul L. Hickman, Los Altos Hills, CA (US)

( * ) Notice: Subject to any disclaimer, the term of this patent is extended or adjusted under 35 U.S.C. 154(b) by 1821 days.

(21) Appl. No.: 09/997,322

(22) Filed: Nov. 27, 2001

Related U.S. Application Data

(63) Continuation of application No. 09/401,026, filed on Sep. 21, 1999, now Pat. No. 6,360,221.

(51) Int. Cl.
*G06F 17/30* (2006.01)

(52) U.S. Cl.
USPC ........................................................ 707/795

(58) Field of Classification Search
USPC ................ 707/10, 104.1, 795; 709/203, 206; 345/719, 727, 748, 749
See application file for complete search history.

(56) References Cited

U.S. PATENT DOCUMENTS

| | | | |
|---|---|---|---|
| 5,297,143 A | 3/1994 | Fridrich et al. |
| 5,396,588 A | 3/1995 | Fressl |
| 5,428,784 A | 6/1995 | Cahill, Jr. |
| 5,513,126 A | 4/1996 | Harkins et al. |
| 5,557,320 A | 9/1996 | Krebs |
| 5,572,648 A | 11/1996 | Bibayan |
| 5,619,648 A | 4/1997 | Canale et al. |

(Continued)

FOREIGN PATENT DOCUMENTS

| | | |
|---|---|---|
| EP | 0 631 419 B1 | 12/1994 |
| EP | 0 340 039 B1 | 9/1999 |

(Continued)

OTHER PUBLICATIONS

TechWeb Encyclopedia, "Streaming" definition, 1 page.*

(Continued)

*Primary Examiner* — Khanh Pham
(74) *Attorney, Agent, or Firm* — Ostrow Kaufman LLP

(57) ABSTRACT

A method for providing an e-mail system including providing a server connected to a network; inputting a message from a sender into the server to be sent as e-mail to at least one recipient mail box on the network; enhancing the e-mail message with a self-executing programmable enhancement; and delivering the e-mail over the network to the at least one recipient mail box. Optionally, the method may provide a number of e-mail boxes on the server assigned to a number of members for the receipt of e-mail addressed to the members at the server, and a menu listing a number of the self-executing programmable enhancements. An e-mail system including a server coupled to a wide area network, and a web site hosted by the server that is capable of at least temporarily storing a message to be sent as e-mail over the wide area network to at least one recipient mail box. The web site provides at least one process for enhancing the message with a self-executing programmable enhancement and information of an advertising nature to create an enhanced e-mail message. The web site further preferably includes at least one mail box associated with at least one member, whereby the member may receive e-mail in the mail box. The information of an advertising nature can include, for example, advertising banners, buttons providing a hyperlink to an advertiser's web site, a part of the self-executing programmable enhancement.

22 Claims, 11 Drawing Sheets

FIG. 2

(56) References Cited

U.S. PATENT DOCUMENTS

| | | | |
|---|---|---|---|
| 5,634,005 A | 5/1997 | Matsuo | |
| 5,659,729 A | 8/1997 | Nielsen | |
| 5,694,616 A | 12/1997 | Johnson et al. | |
| 5,724,521 A | 3/1998 | Dedrick | |
| 5,740,252 A | 4/1998 | Minor et al. | |
| 5,740,374 A | 4/1998 | Raffali-Schreinemachers | |
| 5,774,170 A | 6/1998 | Hite et al. | |
| 5,774,534 A | 6/1998 | Mayer | |
| 5,781,901 A | 7/1998 | Kuzma | |
| 5,790,789 A | 8/1998 | Suarez | |
| 5,793,972 A | 8/1998 | Shane | |
| 5,806,043 A | 9/1998 | Toader | |
| 5,809,242 A | 9/1998 | Shaw et al. | |
| 5,815,830 A | 9/1998 | Anthony | |
| 5,818,447 A | 10/1998 | Wolf et al. | |
| 5,826,023 A | 10/1998 | Hall et al. | |
| 5,826,062 A | 10/1998 | Fake, Jr. et al. | |
| 5,832,208 A | 11/1998 | Chen et al. | |
| 5,832,502 A | 11/1998 | Durham et al. | |
| 5,838,790 A | 11/1998 | McAuliffe et al. | |
| 5,848,397 A | 12/1998 | Marsh | |
| 5,856,825 A | 1/1999 | Yumoto et al. | |
| 5,859,636 A | 1/1999 | Pandit | |
| 5,870,549 A | 2/1999 | Bobo, II | |
| 5,884,246 A | 3/1999 | Boucher et al. | |
| 5,903,269 A | 5/1999 | Poreh et al. | |
| 5,909,545 A | 6/1999 | Frese, II et al. | |
| 5,918,014 A | 6/1999 | Robinson | |
| 5,937,162 A | 8/1999 | Funk et al. | |
| 5,937,392 A | 8/1999 | Alberts | |
| 5,948,061 A | 9/1999 | Merriman et al. | |
| 5,956,486 A | 9/1999 | Hickman et al. | |
| 6,002,393 A | 12/1999 | Hite et al. | |
| 6,014,502 A | 1/2000 | Moraes | |
| 6,014,688 A | 1/2000 | Venkatraman et al. | |
| 6,014,689 A * | 1/2000 | Budge et al. | 709/206 |
| 6,014,698 A | 1/2000 | Griffiths | |
| 6,021,427 A | 2/2000 | Spagna et al. | |
| 6,023,729 A | 2/2000 | Samuel et al. | |
| 6,026,437 A | 2/2000 | Muschett et al. | |
| 6,035,104 A | 3/2000 | Zahariev | |
| 6,049,778 A | 4/2000 | Walker et al. | |
| 6,055,510 A | 4/2000 | Henrick et al. | |
| 6,067,570 A | 5/2000 | Kreynin et al. | |
| 6,078,320 A | 6/2000 | Dove et al. | |
| 6,092,104 A | 7/2000 | Kelly | |
| 6,108,709 A | 8/2000 | Shinomura et al. | |
| 6,134,243 A | 10/2000 | Jones et al. | |
| 6,138,149 A | 10/2000 | Ohmura | |
| 6,144,987 A | 11/2000 | Niemi | |
| 6,167,395 A | 12/2000 | Beck et al. | |
| 6,167,434 A | 12/2000 | Pang | |
| 6,173,337 B1 | 1/2001 | Akhond et al. | |
| 6,185,605 B1 | 2/2001 | Kowaguchi | |
| 6,199,103 B1 | 3/2001 | Sakaguchi et al. | |
| 6,199,106 B1 | 3/2001 | Shaw et al. | |
| 6,205,432 B1 | 3/2001 | Gabbard et al. | |
| 6,212,554 B1 | 4/2001 | Roskowski | |
| 6,219,054 B1 | 4/2001 | Komoda et al. | |
| 6,223,213 B1 * | 4/2001 | Cleron et al. | 709/206 |
| 6,225,993 B1 | 5/2001 | Lindblad et al. | |
| 6,233,317 B1 | 5/2001 | Homan et al. | |
| 6,252,588 B1 * | 6/2001 | Dawson | 345/752 |
| 6,253,231 B1 | 6/2001 | Fujii | |
| 6,275,849 B1 | 8/2001 | Ludwig | |
| 6,301,710 B1 | 10/2001 | Fujiwara | |
| 6,327,612 B1 | 12/2001 | Watanabe | |
| 6,332,156 B1 | 12/2001 | Cho et al. | |
| 6,336,216 B1 | 1/2002 | Curtis et al. | |
| 6,351,763 B1 | 2/2002 | Kawanaka | |
| 6,356,937 B1 | 3/2002 | Montville et al. | |
| 6,360,221 B1 | 3/2002 | Gough et al. | |
| 6,366,949 B1 | 4/2002 | Hubert | |
| 6,381,634 B1 | 4/2002 | Tello et al. | |
| 6,385,644 B1 | 5/2002 | Devine et al. | |
| 6,389,455 B1 | 5/2002 | Fuisz | |
| 6,393,465 B2 | 5/2002 | Leeds | |
| 6,400,810 B1 | 6/2002 | Skladman et al. | |
| 6,405,244 B1 | 6/2002 | Bando et al. | |
| 6,415,332 B1 | 7/2002 | Tuel, Jr. | |
| 6,427,164 B1 | 7/2002 | Reilly | |
| 6,438,583 B1 | 8/2002 | McDowell et al. | |
| 6,449,635 B1 | 9/2002 | Tilden, Jr. et al. | |
| 6,516,351 B2 | 2/2003 | Borr | |
| 6,529,936 B1 | 3/2003 | Mayo et al. | |
| 6,529,946 B2 | 3/2003 | Yokono et al. | |
| 6,549,612 B2 | 4/2003 | Gifford et al. | |
| 6,593,973 B1 | 7/2003 | Sullivan et al. | |
| 6,745,226 B1 | 6/2004 | Gruedalia | |
| 6,769,130 B1 | 7/2004 | Getsin et al. | |
| 2002/0056123 A1 | 5/2002 | Liwerant et al. | |
| 2002/0112005 A1 * | 8/2002 | Namias | 709/206 |
| 2005/0246752 A1 * | 11/2005 | Liwerant et al. | 725/109 |

FOREIGN PATENT DOCUMENTS

| | | |
|---|---|---|
| EP | 0 816 0990 A2 | 9/1999 |
| JP | 7-325827 | 9/1999 |
| JP | 10-171727 | 9/1999 |
| WO | WO 98/58321 | 12/1998 |
| WO | WO 98/58332 | 12/1998 |

OTHER PUBLICATIONS

XP-002150023, "Streaming Email", Sep. 4, 1998, pp. 304-317.*
Alvear J., "Streaming E-Mail", Web Developper.Com Guide to Streaming Multimedia, New York: John Wiley & Sons, US, pp. 304-317 (1998), XP-002150023.*
Tolba et al., "Pure Java-based Streaming MPEG Player", part of the SPIE Conference on Multimedia Systems and Applications, Boston Massachusetts, Nov. 1998. SPIE vol. 3528, pp. 216-224.*
Yourdon, Java, The Web and Software Development, IEEE 1996.
World Wide Web e-mail service provider Hotmail (hereinafter "Hotmail") available through the web site http://www.msn.com provided by the Microsoft Corporation, Exhibit A, pp. 1 through 3 enclosed herewith is a print out of another feature of Hotmail called Mail Handling.
Real Networks, Inc. (hereinafter "RealNetworks") a corporation with headquarters at 2601 Elliott Avenue, Suite 1000, Seattle, WA 98121, offers a line of products that include Real Player and Real Audio and the like. Versions these products may be downloaded from the Internet at http://www.real.com.
Exhibit B is a print out of a page from Activegrams with the address: http://www.activegrams.com?cgi-bin/viewactivegrams.
cgi?dadbday on Sep. 26, 1999.
Exhibit C, which is a print out of a page from Activegrams with the address: http:/www.activegrams.com?cgi-bin/viewactivegrams?cgi?14111215ki on Sep. 21, 1999.
The Internet article, "Death to Spam, A Guide to Dealing with Unwanted E-Mail" (herein after Death to Spam) obtained from the World Wide Web Address http://www.mindworkshop.com/alchemy/nospam.html on Sep. 21, 1999.
The Internet article, "What can you do about bad email?" (herein after "Bad Email") obtained from the World Wide Web address http://www.oitc.com/Disney/WhatToDo.html, on Sep. 21, 1999.
The Internet article, "The Anti-Spam HOWTO" obtained from the World Wide Web address http://www.zikzak.zikzak.net/~acb/features/anit-spam-howto.html on Sep. 21, 1999.
The Internet article, "no Junk E-Mail Database" (herein after "No Junk E-Mail") obtained from the World Wide Web address http://www.glr.com/nojunk.html on Sep. 21, 1999.
The pages obtained on Sep. 21, 1999 from the website entitled "Do-Not-Spam.com" located at the World Wide Web address http://www.do-not-spam.com/.
An Access Control System for Multimedia Applications—Alexandros Kadoglou; poseidon.csd.auth.gr/papers/PUBLISHED/CONFERENCE/Kadoglou97a/Kadoglou97a.ps.Z.
World Wide Web Security; www.cs.jmu.edu/common/coursedocs/cs685c/...b_security.html, May 1999.

* cited by examiner

FIG. 2 eSprinkles.com™

"Do you want that plain, or with esprinkles?"™

- HOME
- ABOUT
- SIGN UP
- CONTACT

MEMBERS
ACCT
PASSWORD
ENTER

AFFILIATES
DISNEY
AMAZON

TO: [ ] TYPE E-MAIL ADDRRESS OF RECIPIENTS
FROM: [ ] TYPE YOUR NAME
RE: [ ] TYPE SUBJECT
MSG: [ ]

CHOOSE YOUR ESPRINKLES (OPTIONAL)

| BUSINESS | FRIENDS | FAMILY | COMMERCIAL | AFFILIATES |
|---|---|---|---|---|
| - URGENT | - MISSING YOU | - HAPPY ANNIVERSARY | - BUY NOW! | DISNEY -TINKERBELL |
| - OPPORTUNITY | - LUNCH? | - HAPPY FATHER'S DAY | - UPDATE! | -MICKEY |
| | - BIRTHDAY | | | AMAZON -BOOKS -VIDEOS |

TOP TEN
① ___
② ___

BEST OF
① ___
② ___

. . .

[CLEAR] [REVIEW] [SEND] [JOIN eSprinkles.com FREE!]

BACK   FORWARD   HOME

METHOD AND APPARATUS FOR THE PRODUCTION, DELIVERY, AND RECEIPT OF AUDIOVISUAL E-MAIL

RELATED APPLICATIONS

This application is a continuation of Ser. No. 09/401,026 which was filed on Sep. 21, 1999 now U.S. Pat. No. 6,360,221.

The present application relates to applications entitled "System, Method and Article of Manufacture for Preventing the Proliferation of Unwanted Electronic Messages", application Ser. No. 09/401,028, filed Sep. 21, 1999; "Method and Article of Manufacture for a Sub-Browser Application Program Stored in an Electronic Message", application Ser. No. 09/400,708, filed Sep. 21, 1999; "Method and Article of Manufacture for Delaying Advertisement Execution in a Geometric Electronic Media Distribution Framework", application Ser. No. 09/400,711, filed Sep. 21, 1999; "Textual Hyperlink Capable of Inputting Text as a Parameter While Executing an Associated Link", application Ser. No. 09/400,712, filed Sep. 21, 1999; and "Method and Apparatus for the Production, Deliver, and Receipt of Enhanced E-Mail", "Electronic Message Payload for Interfacing With Text Contained in The Message", application Ser. No. 09/500,781, filed Sep. 21, 1999; application Ser. No. 09/401,026, filed Sep. 21, 1999, and is now U.S. Pat. No. 6,360,221 B1, issued Mar. 19, 2002, which were filed concurrently herewith and are incorporated herein in their entirety.

BACKGROUND OF THE INVENTION

This invention relates generally to electronic messages and, more particularly e-mail systems utilizing an HTML format for delivery over a TCP/IP protocol network.

E-mail systems of various types have been available for many years. In such systems, user computers or "machines" typically are either intermittently or are permanently connected to a network, such that electronic mail ("e-mail") can be sent from one user's machine to another. Most e-mail systems allow address books and distribution lists to be maintained, such that the e-mail can be sent to one or more designated user machines.

Proprietary e-mail systems have, of course, the associated cost of implementing and maintaining both the network and the e-mail system. With the advent of global networking systems, the cost of e-mail systems has lessened and the popularity of e-mail systems has increased. For example, proprietary providers such as America On-Line (AOL) provide a number of network services, including e-mail, for a set monthly fee. Other web-based service providers, such as Hotmail from Microsoft, Inc., provide free e-mail services to anyone with access to the Internet. While this typically requires the payment of a monthly fee to an Internet Service Provider, other service providers such as AltaVista of Compaq Computer Corporation provide free Internet service. The combination of free e-mail services with or without free Internet services has resulted in an explosion of e-mail accounts and of e-mail messages.

A problem with e-mail documents of the prior art is that they tend to be fairly plain and, therefore, not terribly compelling as a transmission media. Most e-mail is plain text, although the capability of including hypertext markup language (HTML) can add some visual interest. There are even some e-mail providers which provide the capability of embedding static and dynamic graphics. However, e-mail is truly a "push" technology in that it is "pushed" from a server to a recipient without any real interactivity between the recipient and the received media. For this reason, while e-mail such as jokes, etc. may be passed around, the message is quickly discarded and forgotten.

SUMMARY OF THE INVENTION

The present invention provides an enhanced e-mail method and system which increases the enjoyment and usage of e-mail systems, and wide-scale distribution of enhanced e-mail messages. As such, it can be advertiser supported to provide "free" e-mail services for members. Further enhancements can support paid membership services, and commercial services can also be provided.

Briefly, a method for providing an e-mail system in accordance with the present invention includes providing a server connected to a network; inputting a message from a sender into the server to be sent as e-mail to at least one recipient mail box on the network; enhancing the e-mail message with a self-executing programmable enhancement; and delivering the e-mail over the network to the at least one recipient mail box. The method further preferably includes providing a number of e-mail boxes on the server assigned to a number of members for the receipt of e-mail addressed to the members at the server, and a menu listing a number of the self-executing programmable enhancements.

In another aspect of the present invention, a method for providing an e-mail service includes providing a website capable of sending e-mail to at least one recipient mail box, enhancing a message of a sender with a self-executing programmable enhancement and information of an advertising nature to create an enhanced e-mail message, and e-mailing the enhanced e-mail message to the at least one recipient mail box. The information of an advertising nature can include advertising banners, hyperlink buttons to an advertiser's web site, or the enhancement itself.

An e-mail system of the present invention includes a server coupled to a wide area network, and a web site hosted by the server that is capable of at least temporarily storing a message to be sent as e-mail over the wide area network to at least one recipient mail box. The web site preferably provides at least one process for enhancing the message with a self-executing programmable enhancement and information of an advertising nature to create an enhanced e-mail message, and for e-mailing the enhanced e-mail message to the at least one recipient mail box. The web site further preferably includes at least one mail box associated with at least one member, whereby the member may receive e-mail in the mail box. The information of an advertising nature can include advertising banners, buttons providing a hyperlink to an advertiser's web site, a part of the self-executing programmable enhancement, etc.

The e-mail method and system therefore provides a number of distinct advantages over prior art e-mail methods and systems. For one, the enhanced e-mail messages are highly compelling, which will attract users and members to the web site. This increases the advertising value of the system. Furthermore, the e-mail messages are so compelling that they will be passed around the Internet among friends and acquaintances. This will increase visibility of the web site and will also have advantages advertising value. Still further, the ability to push web-type content, audio and/or visual files, and programs to users in the form of self-executing e-mail programs adds a new level of functionality to the Internet.

These and other advantages of the present invention will become apparent to those skilled in the art upon a reading of the following descriptions of the invention and a study of the several figures of the drawing.

BRIEF DESCRIPTION OF THE DRAWINGS

FIG. 2 is an illustration of an exemplary home page of the present invention;

DETAILED DESCRIPTION OF THE PREFERRED EMBODIMENTS

Figure 1:
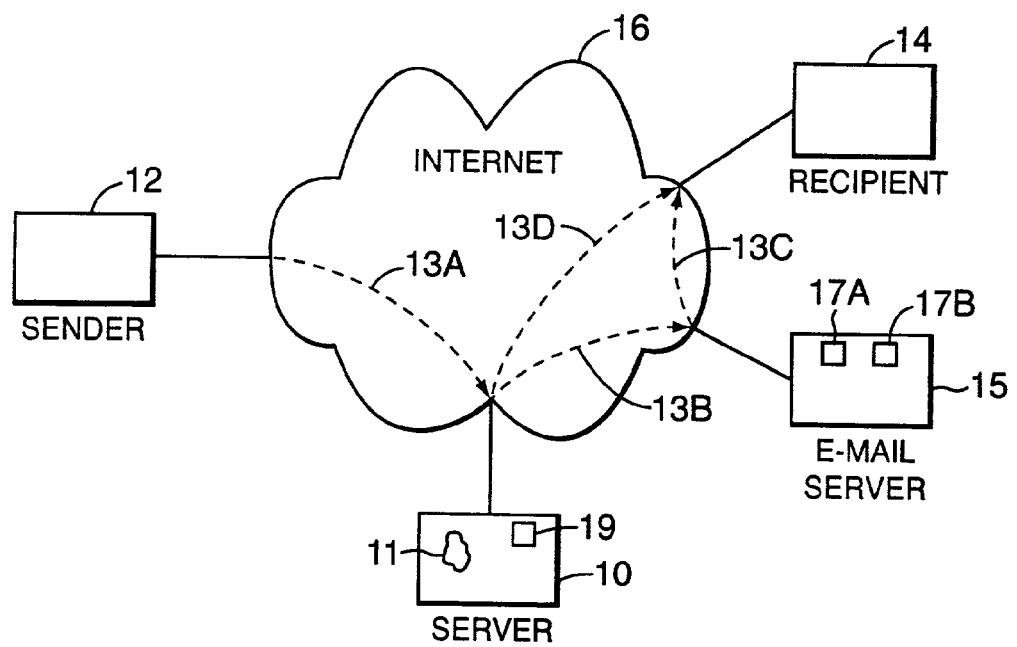
FIG. 1 is a depiction of an Internet based e-mail system in accordance with the present invention.

FIG. 1 illustrates a server machine 10, a sender machine 12, and a recipient machine 14 coupled to a global network, such as the Internet 16. By "machine" it is meant computer systems or other digital electronic device capable of communicating with a network, such as Internet 16. A typical "machine" is a personal computer, workstation, or other computer operating with a suitable operating system such as Windows NT, the Macintosh OS, Linux, Solaris, Unix, etc. Such computers typically utilize one or more microprocessors, volatile and non-volatile memories (computer readable media), and input/output (I/O) devices which allow, for example, communication with users and with other machines, networks, and peripherals. The network in this example is the Internet operating on the well-know TCP/IP packet network protocols, but other networks such as Intranets, Extranets, and networks working on other protocols (e.g. Netware, Appleshare, etc.) are also suitable for embodiments of the present invention.

In the present invention, server machine 10 "hosts" an e-mail web site 11. A sender at sender machine 12 can "upload" or enter message content to the web site 11 through the Internet 16 as indicated at 13A. This is typically accomplished via a web browser on sender machine 12 "opening" the web site 11 on the server 10. The web site 11 then, under the guidance of the sender, "enhances" the message content and sends or "e-mails" the message to one or more recipient mail boxes as illustrated at 13B. In this instance, mail boxes 17A, 17B, etc. are hosted by an e-mail server machine 15 connected to the Internet 16. Such e-mail mailboxes are provided by a variety of vendors, including America On Line (AOL), Hotmail, etc. The recipient then accesses his or her mail box to receive the enhanced e-mail at the recipient machine 14 via the Internet 16 as indicated at 13C. Alternatively, if the recipient is a member of the web site 11, he or she can receive the e-mail directly from an e-mail box 19 on the server 10 as illustrated at 13D. As noted previously, some or all of the various processes, services, mail boxes, etc. may be distributed around the network 16, as will be appreciated by those skilled in the art.

In FIG. 2, a "home page" 18 of the present invention is "hosted" on a server 10 connected to the Internet 16. By "hosted" it is meant that a computer program implementing a process capable of displaying the home page 18 and interacting with users connected to the Internet 16 resides, in part or in whole, on the server 10. It should be noted that the Internet 16 is suitable for supporting distributed computing, where the computer implemented processes are shared among multiple machines, as will be appreciated by those skilled in the art.

In the present example, the home page 18 includes a navigation bar 20 and a content area 22. The navigation bar 20 include hypertext "links", typically to other pages supported by the server 10 or by other servers (e.g. by a server of an affiliate). In this example, the navigation bar includes links to "home", "about", "sign-up", and "contact" pages, which are preferably (but not necessarily) hosted on the server 10. The "home" link will return to the content area 22 of the home page. The "about" link will create a content in content area 22 that describes the company "eSprinkles.com" and its services. The "sign-up" link will create a content in content area 22 for member signup. This page will be described in greater detail with respect to FIG. 2B. The "contact" line will create a content in content area 22 for contacting eSprinkles.com, such as by e-mail, telephone, postal service mail, etc.

The navigation bar 20, in this example, also includes a member area 24 which can be accessed by typing in an account, a password, and "clicking" on an "enter" key. This will create a content in content area 22 which permits a number of member services that are not available to non-members. An example of a members content area will be discussed with reference to FIG. 2A.

Also in the exemplary navigation bar 20 is an area where "Affiliates" are listed. These Affiliates can have a business relationship with the e-mail hosting company (eSprinkles.com in this example), or may have paid to be listed as an Affiliate, or may pay for "click throughs" from users at the eSprinkles.com web site.

Typically, the navigation bar 20 will remain regardless of the content (e.g. page or other content) of the content area 22. This provides a consistent and convenient method for navigating the entire publicly accessible "web site" of the e-mail provider, in this example, the public web site of eSprinkles.com.

The content area 22 of the home page 18 has a header "eSprinles.com", as well as its trademarks "Do you want that plain, or with eSprinkles?" There are then a number of fields that can be filled-in, including a "To:" field for e-mail addresses of recipients. This can be one or more e-mail addresses such as "jdoe@aol.com" or "jdoe@aol.com; rsmith@hotmail.com; fjones@esprinkles.com." Then, there is a "From:" field where the sender can type his or her name, such as "Sam Adams" and an "Re:" field where the sender can send a regarding message such as "Hi Jane!!" The message itself can be typed into a message field. Scroll bars can be used for fields that might contain more information that can be displayed within the "window" of the field, such as the "To:" field and the "Msg:" field.

The sender then has the option of enhancing his or her message with eSprinkles. These are shown arranged by categories such as "Business", "Friends", "Family", "Commercial", and "Affiliates." Of course, these categories are merely exemplary, and other categories are contemplated. For example, and without limitation, there can be a "Top Ten" category and a "Best Of" category. Within each of the categories, there are a number of enhancements or "eSprinkle" e-mail enhancements. For example, if the "Tinkerbell" eSprinkle e-mail enhancement is chosen from the Disney affiliate, a Tinkerbell could flutter across the e-mail sprinkling fairy dust and then land on a Disney link button.

At the bottom of the screen, a number of "buttons" may be provided to provide specialized functions. For example, a "Clear" button can clear the field of the content area 22. A "Review" button will allow the sender to review the e-mail message, with its enhancements (if any) before sending the enhanced e-mail message. A "Send" button allows the e-mail to be sent, and a "Join eSprinkles.com Free!" button allows a user to join the eSprinkles web site as a member in order to enjoy additional features of the e-mail system, such as being able to receive e-mail at an eSprinkles.com e-mail address. At the bottom of content area 22 are some links to go "Back" one page, "Forward" one page, or "Home."

Figure 2A:
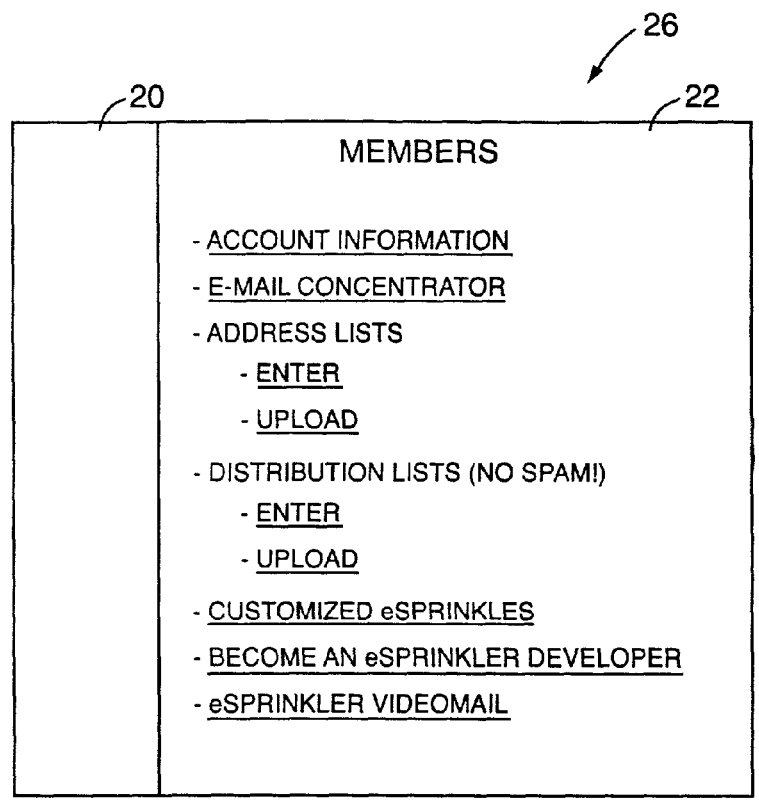
FIG. 2A is an illustration of an exemplary member's page of the present invention.

A members page 26 is shown in FIG. 2A. The navigation bar 20 typically stays essentially the same, while the content area 22 displays content that is available only to members of the web site. This page 26 is accessed by the members area 24 of the navigation bar 20 (see FIG. 1) by entering the account number and password. The content area 22 of the members page 26 of FIG. 2A in this example includes a number of links including "Account Information", "e-mail concentrator", "Enter" Address Lists, "Upload" Address Lists, "Enter" Distribution Lists, "Upload" Distribution Lists, "Customized eSprinkles", "Become an eSprinkle Developer", and "eSprinkle Video Mail." The Account Information opens a link or window or screen which allows a member to view, modify and/or update his or her member profile and other account information. The e-mail concentrator allows a user to set up a process by which e-mail from other e-mail accounts (e.g. AOL, Hotmail) is forwarded or "concentrated" at his or her eSprinkles e-mail account. As an option, notifications of the existence and use of the eSprinkles e-mail account may be sent to other accounts in an address book, manually entered, etc. The Address Lists "Enter" and "Upload" links allow e-mail addresses to be entered into the member's account, or to be uploaded to the member's account. To upload the e-mail addresses, a member can, for example, have a text-based list of his or her e-mail addresses as a file on his or her computer, and then direct the website to copy this file onto the member's website based address list. Similarly distribution lists such as "friends", "family", "club members", can be created or uploaded by the member to the website. The Customized eSprinkles can be of the member's own design, and stored on the website for future use. Members can also become eSprinkle developers, who may be included on the home page 18 should they create a notable eSprinkle e-mail enhancement. The eSprinkle VideoMail feature allows a window to be opened on an eSprinkle e-mail message that connects, via the Internet, to the eSprinkle website in order to play an audiovisual "VideoMail" message to the e-mail recipient.

Figure 2B:
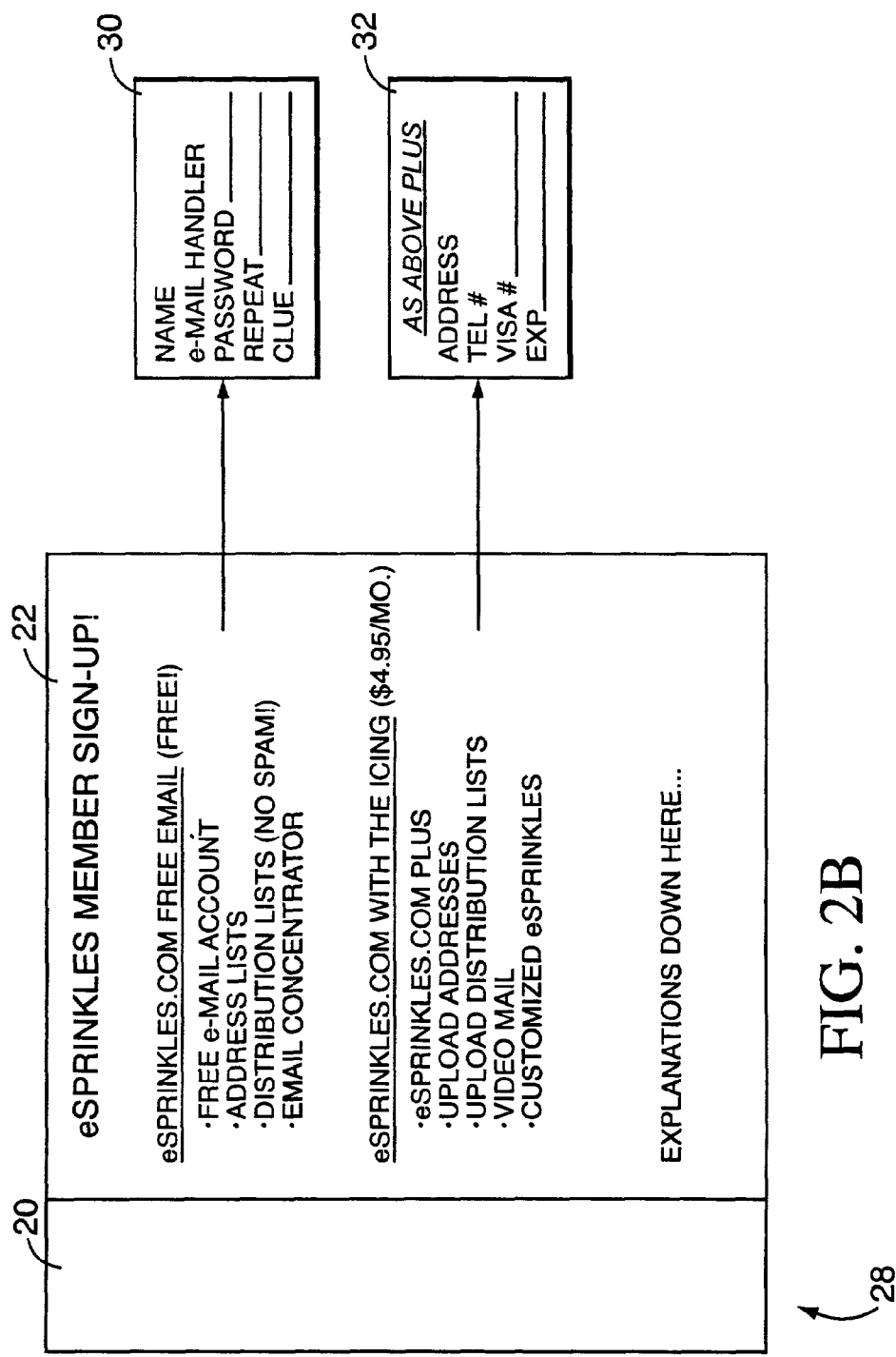
FIG. 2B is an illustration of an exemplary member sign-up page of the present invention.

FIG. 2B illustrates an exemplary member sign-up web page 28. More particularly, the web page 28 includes the navigation bar 20 and a content area 22 that includes, in this example, several membership options. More particularly, content area 22 gives the option of a free (advertising sponsored) e-mail service, or an enhanced e-mail service at a monthly charge. In an alternate embodiment of the present invention, a commercial version of the service allows for mass enhanced e-mail messaging (preferably of a non-spamming nature) at a fixed rate, e.g. for five cents a message. The advertising supported "free" e-mail can include banner advertisements (of the "click through" type or not), and buttons which provide hyperlinks to advertiser web pages. It will be appreciated that "click through" banner advertisements and buttons are very similar in nature. Advertisers can pay for each message sent, or for "click throughs" from the banners and buttons. The paid membership is designed for non-commercial users that are willing to pay for more enhanced e-mail functionality, such as the ability to create customized eSprinkle enhancements, to upload distribution lists, etc. The advertising may be omitted for paid memberships, although a link to the eSprinkle web site (which is a form of advertising by the e-mail system host) is likely to be included. In addition, it is contemplated that the ability to send audio and/or video information in the form of an e-mail will be a paid membership benefit, since such information requires a substantial amount of disk storage space on the server.

As seen in FIG. 2B, the exemplary member sign-up page includes hyperlinks labeled "eSprinkles.com Free eMail" and "eSprinkles.com With the Icing", for the free and paid membership services, respectively. The first link, in this example, opens a window or web page 30 which allows a user's name, e-mail "handle" or screen name, password, and password clue to be entered. This screen is kept very simple to encourage users to sign up for a free e-mail account. Alternatively, more information such as the member's postal service mailing address, other e-mail addresses, telephone numbers, member demographics, etc. can be asked, at the tradeoff of perhaps obtaining fewer free members. Signing up for the free service are intended to provide a number of member services such as a free e-mail account maintained at the server for the member, the ability to create address and distribution lists, and the ability to use the e-mail concentrator.

The "eSprinkles.com With the Icing" is a paid membership service for those willing to pay for additional member services. When accessing this second link of web page 28, a window or web page 32 is opened which asks for the information of page 30 and, in addition, address and credit card information so that the monthly charge can automatically be applied to the credit card. Some additional member services of the paid service are contemplated to include the ability to upload addresses and distribution lists, the ability to e-mail audio and video content, and the ability to create and edit their own enhancement content.

As mentioned previously, the membership page 28 contemplates non-commercial usage of the web site. As such, unlimited e-mails can be sent, but the ability to create large mailing lists is preferably curtailed. This is to prevent overuse by commercial entities and to prevent "spamming", i.e. unwanted e-mail broadcast to large distribution lists. It is contemplated that the free e-mail membership will have a very limited distribution list capability (e.g. 20 members in a distribution list), while the paid membership will have a somewhat larger list capability (e.g. 100 members in a distribution list). This will make it difficult for commercial users or "spammers" to create distribution lists of many thousands or even millions of e-mail addresses.

Also as mentioned previously, the present invention includes the ability to create commercial distribution lists as well. This can be implemented in several fashions. For one, the software providing the enhanced e-mail capability can be sold or licensed to large commercial users. Alternatively, the web server can provide this capability by allowing large distribution lists to be uploaded to the server, and then the e-mails can be sent to the recipients on the distribution lists. This second method also allows for easy monitoring of the number of sent and delivered e-mails for billing purposes to the commercial user.

Figure 3:
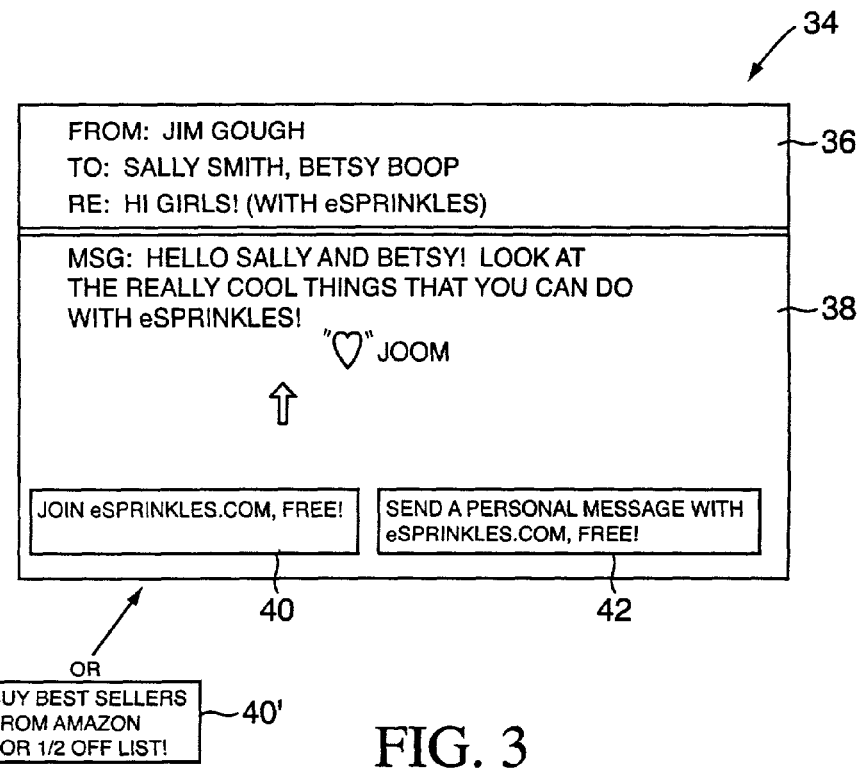
FIG. 3 is an illustration of an exemplary e-mail of the present invention.

In FIG. 3, an exemplary enhanced e-mail message 34 is illustrated. The e-mail message 34 includes a header 36 with sender, recipient, and "Re" information, and a body 38 with message content and advertising information. The message content can include message text input by the sender, and may be enhanced by a self-executing program. In this instance, the program replaces the word "I" with a pair of eyes having pupils that "look at" or track the cursor, and which also replaces the word "Love" with a beating heart. The advertising information includes banner/buttons 40 and 42. The advertising can be for a third party advertiser (amazon.com in this example) as illustrated at 40', or can be advertisement for the e-mail provider itself (eSprinkles.com in this example) at 40. By clicking on an advertising banner/button 40', the e-mail provider may be paid per click, e.g. ten cents a click-through, or may be paid by a percentage of the sales made by the advertiser to the person who clicked on the banner/button.

It will therefore be appreciated that the present invention includes a method for providing an e-mail system including that includes providing a server 10 connected to a network 16; inputting a message from a sender into the server to be sent as e-mail to at least one recipient mail box on the network; enhancing the e-mail message with a self-executing programmable enhancement; and delivering the e-mail over the network to the at least one recipient mail box. In the present example, the sender uses a sender machine 12 provided with a web browser to interact with a web site hosted on the server 10, while the recipient uses a recipient machine 14 which can interact with the web site on server 10 if the recipient is a member with an e-mail box on the server 10. Alternatively, the recipient can be in communication with a mail box hosted anywhere over the network 16 by connecting to the network through the services of an Internet Service Provider (ISP). Therefore, the recipient(s) do not need to have direct interaction with the server 10 of the present invention in order to receive enhanced e-mail.

It will also be appreciated that an e-mail system of the present invention includes a server 10 coupled to a wide area network, such as the Internet 16; and a web site hosted by the server that is capable of at least temporarily storing a message to be sent as e-mail over the wide area network to at least one recipient mail box, the web site providing at least one process for enhancing the message with a self-executing programmable enhancement and information of an advertising nature to create an enhanced e-mail message, and for e-mailing the enhanced e-mail message to the at least one recipient mail box. Preferably, the e-mail system web site further includes at least one mail box associated with at least one member, whereby the member may receive e-mail in the mail box.

FIGS. 4-11 illustrate a method and a system for providing an application program adapted to be incorporated as a "payload" of an electronic message. Such application program is automatically initialized after the electronic message is selected by a user. After initialization, the application program is executed. The execution of the application program includes various features.

For example, such execution may include displaying text included with the first electronic message, displaying indicia, allowing entry of text, and sending the entered text and the application program over a network in a second electronic message to a second user upon selection of the indicia. In one embodiment, a code segment may be executed which includes as a parameter at least a portion of the text included with the electronic message, thus incorporating the text with any type of functionality, i.e. graphic, etc. Still yet, other features may be included such as an advertisement that is displayed only after the electronic message is forwarded a predetermined number of instances. Also, the text included with the electronic message may constitute a hyperlink which, when selected, links to a site and enters the text as a parameter upon such linking.

As will become apparent, the personal text of the electronic message may induce the user to open the mail while the functionality may serve as an inducement to send the electronic message to another user. This in turn may be used to incur visits to a particular site on the network. In the alternative, it may serve to afford widespread exposure of advertisements or any other feature that supports e-Commerce.

Figure 4:
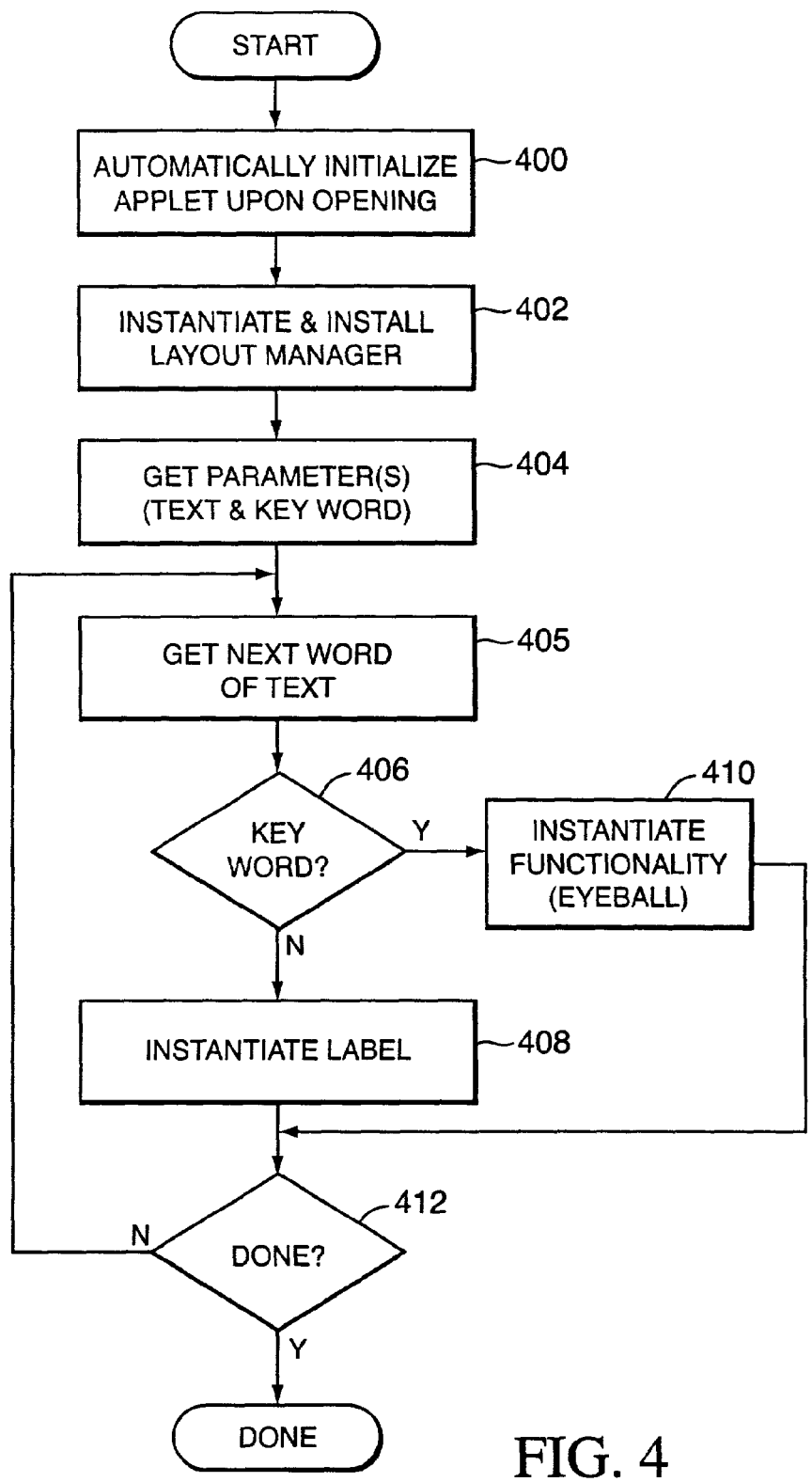
FIG. 4 is a flowchart illustrating the execution of the first application program of one embodiment of the present invention.

FIG. 4 is a flowchart illustrating the execution of the first application program associated with the first electronic message that is sent to a first user. The first electronic message may be received over any network such as a wide area network. In one embodiment, such wide area network may include the Internet and the first electronic message may be transmitted using a protocol such as TCP/IP and/or IPX. The first electronic message includes a first application program incorporated therein by any desired technique, along with a message, i.e. graphic, textual, audible, etc., generated by a previous user. In one embodiment, at least a portion of the first application program includes a JAVA APPLET. In the alternative, such first application program may include code segments written in any desired object-oriented computer programming or markup language.

As shown in operation 400 of FIG. 4, the first application program of the first electronic message is automatically initialized upon being selected, or "opened", by a user on an electronic mail browser, i.e. NETSCAPE COMMUNICATOR, MICROSOFT OUTLOOK, etc. Such selection may include "clicking" on an identifier of the first electronic message, or any other technique enabled by the electronic mail browser. Upon such user action, the first electronic message is initialized immediately in an automated manner. To accomplish this, the first application program may depart from an "attachment" in the traditional sense, and be included in the first electronic message itself. Further, the electronic mail browser must be capable of automatically recognizing and executing the computer or markup language employed by the application program, a common capability among electronic mail browsers.

Initialization of the first application program may include determining various variables and other parameters required to execute the application program, or any other "pre-execution" duties. For example, one of such parameters may comprise the body of text included with the first electronic message.

In one embodiment, hypertext markup language may be included with the first electronic message to contain the parameters and call another portion of the first application program such as a JAVA APPLET located at another site on the network. It should be noted, however, that the hypertext markup language itself or any other computer or markup language included with first electronic message may constitute a component or an entirety of the first application program. In other words, any desired portion (including no portion) of the first application program may be positioned at a separate location on the network.

Programs that execute the foregoing eyeball graphic feature are commonly known to those of ordinary skill. Such programs commonly use atan (2) in order to compute the angle between the eyeball and the mouse cursor. An example of a code segment that executes the mouse listener feature, and that calls the eyeball graphic feature is as follows:

```
import java.applet.*;
import java.awt.*;
import java.lang.*;
import java.util.*;
import java.awt.event.*;
import java.net.*;
public class HelloAgainWorld extends Applet
{
  Image backBuffer;
  Graphics backG;
  String s = "null";
  public void init( )
  {
    //this.setLayout(null);
    this.setLayout(new FlowLayout(FlowLayout.LEFT));
    s= getParameter("info");
    StringTokenizer parser = new StringTokenizer(s);
    try
    {
      while(parser.hasMoreTokens( ))
      {
        String a = parser.nextToken( );
        if (a.equals("I"))
        {
          Eyeball2 eye = new Eyeball2(this);
          eye.setSize(30, 30);
          add(eye);
          Clicker click = new Clicker(this);
          eye.addMouseListener(click);
        }
        else
        {
          Label helloLabel = new Label( );
          helloLabel.setText(a);
          helloLabel.setForeground(new Color(170, 27, 140));
          add(helloLabel);
        }
      }
    }
    catch (NoSuchElementException e)
    {
    }
  }
  public void paint(Graphics g)
  {
    maintain( );
    super.paint(backG);
      g.drawImage(backBuffer, 0, 0, null);
  }
  public void update(Graphics g)
  {
    maintain( );
    super.update(backG);
```

-continued

```
      g.drawImage(backBuffer, 0, 0, null);
  }
  void maintain( )
  {
    // Maintain the back buffer and the graphics context that is
  directed towards the back buffer.
    {
      int w = getBounds( ).width;
      int h = getBounds( ).height;
      // If there is no buffer or it is the wrong width, or it is
    the wrong height, then adjust the back buffer.
      if ( backBuffer == null || backBuffer.getWidth(null) != w ||
    backBuffer.getHeight(null) != h )
      {
        // Adjust the back buffer.
        backBuffer = createImage( w, h );
        // If we have a backBuffer, then make a graphics context
      that is directed towards the back buffer.
        if (backBuffer != null)
        {
          // Dispose of any previous graphics context that may
        have pointed to a previous back buffer.
          if ( backG != null )
          {
            backG.dispose( );
          }
          // Now create the graphics context that is directed
        to the back buffer.
          backG = backBuffer.getGraphics( );
        }
      }
    }
  }
}
class Clicker implements MouseListener
{
  Applet a;
  URL url;
    Clicker(Applet _a)
    {
      a = _a;
    }
    public void mouseClicked(MouseEvent evt)
    {
    }
    public void mousePressed(MouseEvent evt)
    {
    }
    public void mouseReleased(MouseEvent evt)
    {
      AppletContext ac = a.getAppletContext( );
      try
      {
        url = new URL("http://207.82.252.253/cgi-
    bin/linkrd?_lang=&hm__action=
    http%3a%2f%2fwww%2eneostar%2ecom");
      }
      catch (MalformedURLException e)
      {
        System.out.println("I was a malformed url");
      }
      ac.showDocument(url);
    }
    public void mouseEntered(MouseEvent evt)
    {
    }
    public void mouseExited(MouseEvent evt)
    {
    }
}
```

It should be noted that any type of functionality may be incorporated during the execution of the first application program. For example, advertisements may be displayed, etc.

Figure 5:
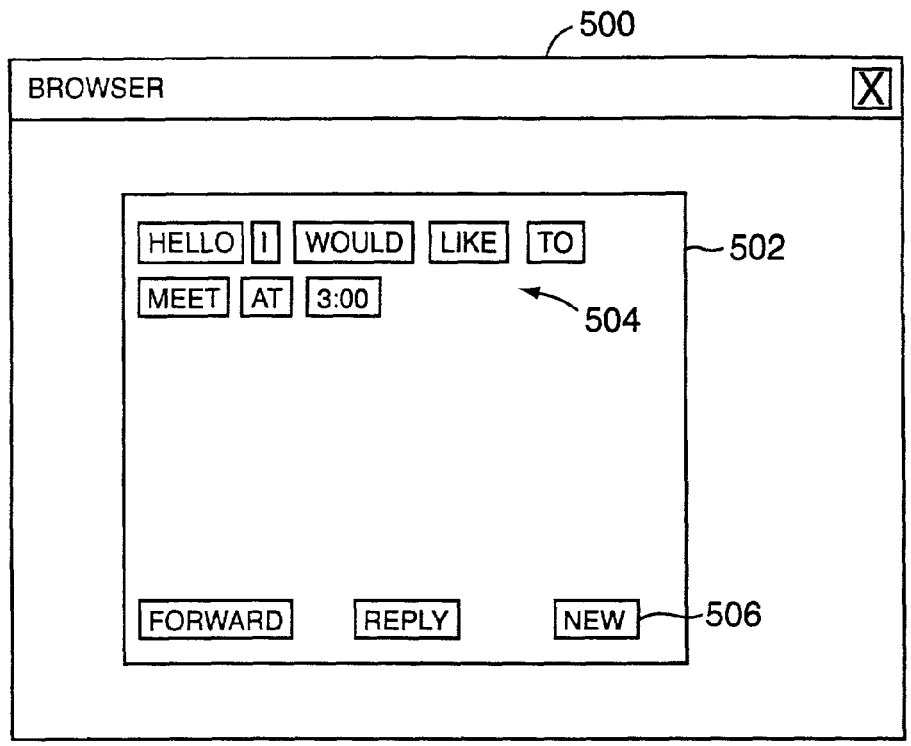
FIG. 5 is an illustration of a graphical user interface of the present invention that is displayed upon the execution of the first application program, and which is used to display the text of the first electronic message and any functionality associated therewith.
Figure 7:
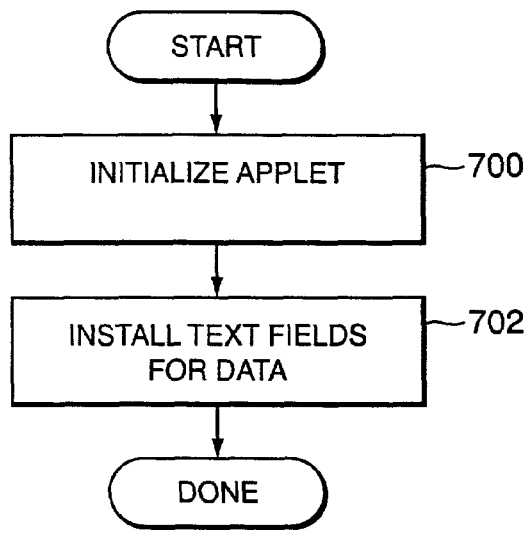
FIG. 7 illustrates the execution of the second application program of the present invention which is initiated upon the selection of one of the "FORWARD", "REPLY", or "NEW" icons displayed in the graphical user interface of FIG. 5.

FIG. 7 illustrates the execution of the second application program of the present invention which is initiated upon the selection of one of the first indicia 506, i.e. the "FORWARD", "REPLY", and/or "NEW" icon, displayed in the graphical user interface of FIG. 5. In particular, it will be assumed in the present description that the "NEW" icon has been selected. It should be noted, however, that given the present description it would be well within the ability of one of ordinary skill to implement the "FORWARD" and "REPLY" functions. With respect to the "REPLY" icon, there may be a need for a mechanism of transferring the body of text from the first application program to the second application program. This may be accomplished by a "cookie" or similar metadata-type information.

As shown in FIG. 7, a second application program is initialized upon the selection of the first indicia 506 in operation 700. It should be noted that, in one embodiment, the second application program may be a component of the first application program thus rendering a single application program. In one embodiment, the first application program includes an un-signed application program and the second application program includes a signed application program.

Similar to the first application program, initialization of the second application program may include determining various variables, and other parameters required to execute the application program. Next, in operation 702, text fields are installed for allowing entry of text by the first user.

Figure 8:
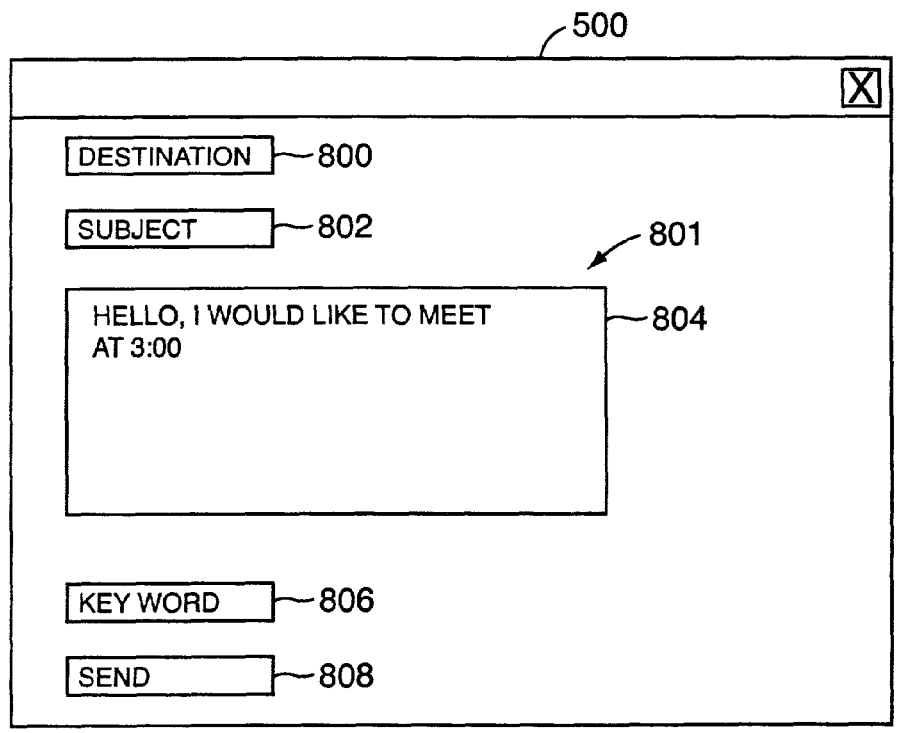
FIG. 8 is an illustration of a graphical user interface associated with the execution of the second application program in accordance with one embodiment of the present invention.

FIG. 8 is an illustration of a graphical user interface associated with the execution of the second application program. As shown, a plurality of text fields 801 are displayed within the frame 500 of the network browser. Included are a destination text box 800 for allowing the insertion of an electronic mail address of a desired destination, a subject text box 802 for allowing entry of a subject of a message, a body text box 804 for allowing entry of a body of text or message, and a key word text box 806 which is adapted for allowing entry of the key string parameter. Also included is second indicia 808 which may take the form of a "SEND" icon or the like.

Figures 9, 10:
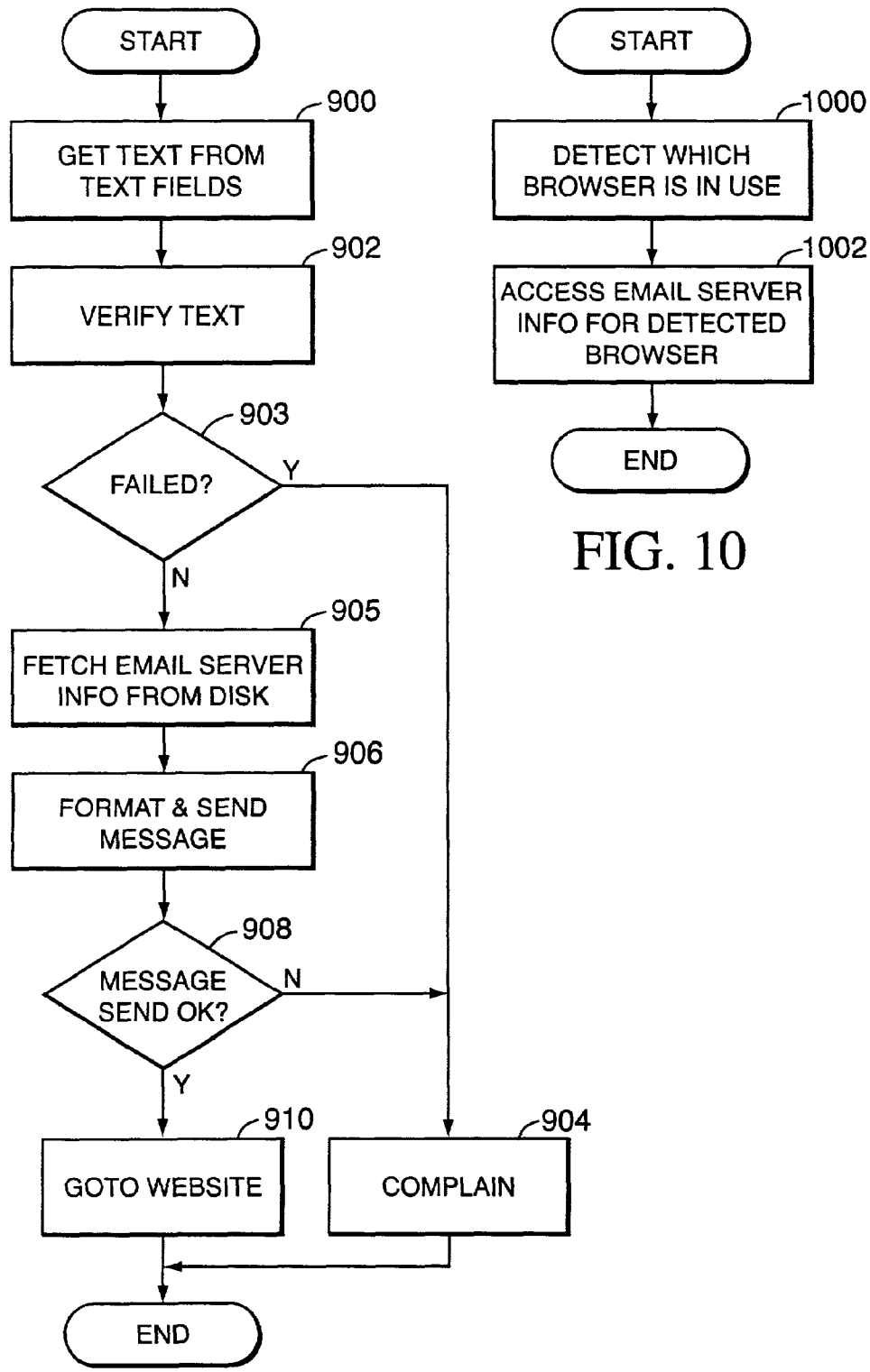
FIG. 9 is a flowchart illustrating the continued execution of the second application program upon the selection of the "SEND" or other similar icon on the graphical user interface of FIG. 8.
FIG. 10 is a flowchart illustrating the operations associated with the fetch e-mail operation of FIG. 9.

FIG. 9 is a flowchart illustrating the continued execution of the second application program upon the selection of the second indicia 808, i.e. "SEND", on the graphical user interface of FIG. 8. As shown, in operation 900, the text is first retrieved from the text fields 801 of the graphical user interface of FIG. 8. Next, in operation 902, the text is verified to ensure that each of the necessary text fields are filled and valid. For example, the text boxes 800 and 804 may be required.

If it is determined by decision 903 that the verification of operation 902 fails, a complaint is issued in operation 904. Such complaint may take the form of a pop-up window or the like, and may describe the nature of any defects. On the other hand, if the verification of operation 902 succeeds and all of the necessary fields are filled, information associated with an electronic mail server of the first user is retrieved in operation 905. This may be accomplished by accessing a hard drive of a computer of the first user which is running the network browser and electronic mail browser. The purpose of obtaining this information is to identify a server from which the information in the text fields 801 may be sent in the form of a second message. In the alternative, a single designated server may be automatically identified by the second application program, thus obviating the need to access the hard drive of the computer of the first user.

Upon identifying a server from which the second message is to be sent, the second electronic message may be formatted and sent to a second user in operation 906. Upon being sent, another verification may be executed in decision 908 in order to ensure that the second electronic message was sent in a satisfactory manner. If successful transmittal of the message is not verified, a complaint may be issued in a manner similar to that discussed hereinabove with respect to operation 904.

If, on the other hand, successful transmittal of the message is verified in decision 908, the second application program may optionally link the first user to a site on the network in operation 910. Such site may be identified by the second application program. This feature may thus be used to increase a number of visits, or "hits", on a particular site which in itself may warrant substantial consideration.

FIG. 10 is a flowchart illustrating the operations associated with the fetch e-mail operation 905 of FIG. 9. As mentioned earlier, this may be accomplished by accessing a hard drive of a computer of the first user which is running the network browser and electronic mail browser. Before this may be effected, in operation 1000, the browser(s) that is currently in use may be detected after which the appropriate information may be accessed in operation 1002. As an option, permission to retrieve such information may be gained from the first user prior to any action being taken.

Figure 11:
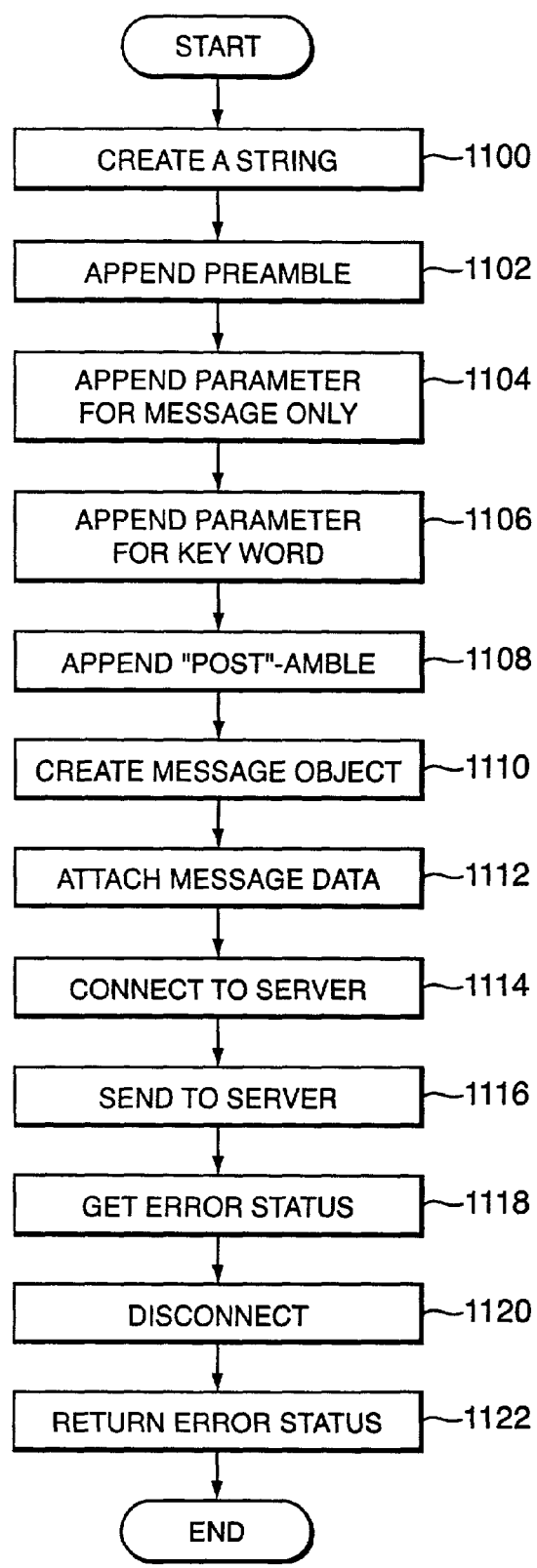
FIG. 11 is a flowchart illustrating the operations associated with the format and send message operation of FIG. 9.

FIG. 11 is a flowchart illustrating the operations associated with the format and send message operation 906 of FIG. 9. The format refers to the hypertext mark-up language of which an example was provided earlier. In order to generate such format, a string is first created in operation 1100. Thereafter, a preamble is appended to the string in operation 1102. Thereafter, the body of text and key string parameters are appended in operations 1104 and 1106 after which a postscript is appended in operation 1108. An example of each of the foregoing appended elements are outlined as follows using the example set forth earlier:

Preamble
   <HTML>
   <HEAD>
   <TITLE>Practice Applets</TITLE>
   </HEAD>
   <BODY>
   <APPLET CODEBASE="http://esprinkles.com" (*$1^{st}$ app. program*)
   CODE="HelloAgainWorld.class"
ARCHIVE="eyejar.jar" WIDTH=1000 HEIGHT=1000
   ALIGN=left>
Parameter
   <PARAM NAME=info VALUE=" . . . body of text . . . ">
Parameter
   <PARAM NAME=keystring VALUE="I">
   Note: multiple key strings and adaptive keys may be used to identify the letter, expression, word, phrase, pattern, format, etc.
Postscript
   </APPLET>
   </BODY>
   </HTML>

With continuing reference to FIG. 11, a message object is then created in operation 1110. Thereafter, the string and appendages, or message data, is attached to the object in operation 1112 using the JAVA mail API. Using the information collected about the server, a connection is then effected with the desired host server in operation 1114 after which the message object and data are sent in operation 1116. In the case of multiple electronic mail destinations, this operation may be repeated as many times as required. An error status is then retrieved in operation 1118 to enable the decision 908 of FIG. 9. Next, the server is disconnected in operation 1120 and the error status is returned in operation 1122.

Figure 6:
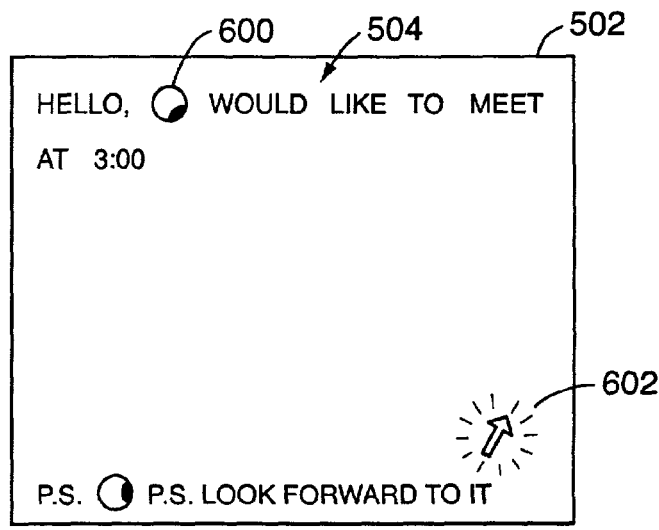
FIG. 6 illustrates one example of the functionality displayed upon execution of the first application program in accordance with one embodiment of the present invention.

One example of functionality that may be implemented by the first application program was shown in FIG. 6. It should be noted, however, that any type of functionality may be employed by running a code segment including as a parameter at least a portion of the text included with the electronic message.

In various embodiments, the functionality may include the incorporation of an image, video, a specific graphic feature, or any other type of object for that matter. For example, any type of theme such as rabbits, earthquakes, popular icons and trademarks may be employed during the display of the text associated with the electronic message. As an option, such graphics may in some way interact with the text of the electronic message.

For example, where the theme is earthquakes, the text may be shown to shutter or the like. Or, where the theme is rabbits, the rabbits may be shown hopping from word to word. Still yet another example includes dressing or undressing an icon in various attire or providing any other type of feedback based on user input. As an option, the selection of the graphic or icon may initiate a link to a predetermine site on the network. Still yet, the application program may be adapted to allow the object to be substituted with any of the strings of the text while it is being shown. This may be accomplished with a select and "drag" feature.

In another embodiment, the execution of the first application program may include linking a string of the text of the first electronic message with a site on the network. In other words, such string constitutes a hyperlink. In such embodiment, the execution of the first application program may further include automatically inputting the string as a parameter to the site on the network upon selection of the hyperlink for various purposes. In the case where the site is a search engine, the string may be automatically entered as a search term in the search engine upon the selection of the hyperlink, thus prompting immediate reaction by the search engine. One example of an implementation of this concept is as follows: http://www.search_engine.com/?MT=keystring&SM=MC&DV=0&LG=any&DC=10&DE=2&_v=2&OPs=MDRTP In still another embodiment, the functionality associated with the electronic messages provides an inducement for sending them to additional users. With this exposure, the present invention may be used to propagate advertisements over the network. First, the electronic message is provided with the application program attached thereto which is capable of displaying an advertisement. As the message is communicated over the network, each instance of such communication is detected.

As such, the number of the instances that the electronic message is communicated over the network may be traced. The advertisement is then displayed after a predetermined number of the instances greater than one has been tracked. By employing this technique, the users will not be thwarted from forwarding the electronic message until after a predetermined geometric propagation has already taken place. It should be noted that the foregoing tracking ability may also be used to base a determination of compensation from the advertiser.

As an option, the predetermined number may be based on a Fibonacci sequence for optimized perpetuance of the electronic message. Further, the predetermined number may be based on a generation of the electronic message. As an option, the advertisement may be displayed by automatically linking to a site on the network.

The forgoing descriptions provide a basic framework for understanding many of the advantageous features of the present invention. It will be appreciated that the technology has many applications. Some of the applications will be discussed below by way of example, not limitation.

Figure 12:
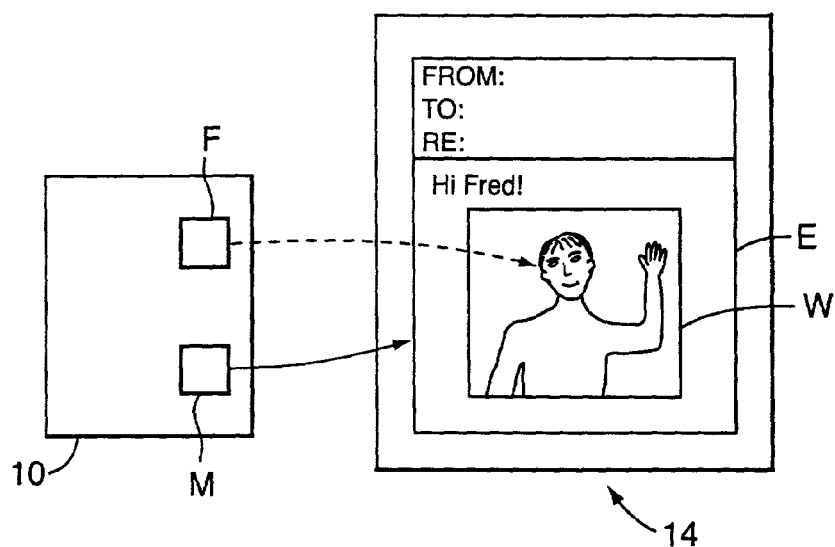
FIG. 12 is an example of audio and/or visual content being e-mailed to a recipient according to the present invention.

In FIG. 12, audio and/or visual content can be "e-mailed" to one or more recipients. There are several ways of implementing this feature, as will be appreciated by those skilled in the art. A preferred method is for a member to provide an audio and/or e-mail message which is stored on server 10 as a file F. In addition, a text message can be stored as a file M. The web site then creates an e-mail message E which is displayed on a recipient's machine 14 that includes (for visual messages) a window W for the display of video information (VideoMail). This video information can be a part of the e-mail message, or it can be streamed from the server 10 over the network, as will be appreciated by those skilled in the art.

Figure 13:
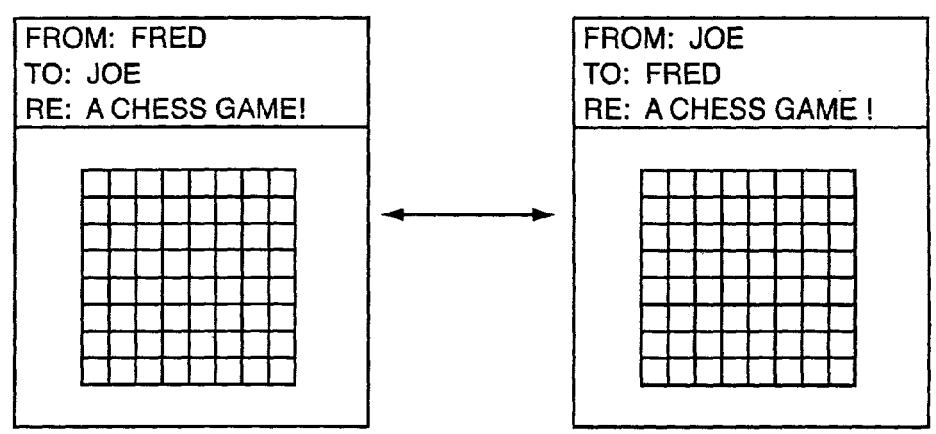
FIG. 13 is an example of an interactive game being e-mailed between two recipients according to the present invention.

In FIG. 13, an enhanced e-mail of the present invention is being e-mailed back and forth between two recipients. In this case, the e-mail includes an interactive game of chess. A first recipient makes a first move on the chess-board, such as with his pointing device, and then e-mails it to a second recipient. The second recipient then makes a second move, and e-mails it back to the first recipient, and so forth. The enhanced e-mail therefore implements a chess game program which remembers positions, enforces rules, etc. It is therefore apparent that the enhanced e-mail is capable of interacting with one or more recipients, and of increasing and modifying its store of data. It should be noted that video cameras, or "micro-cameras", that are commonly mounted on computers may be used to facilitate such interaction. Use of such cameras is becoming more and more of a standard feature.

Figure 14:
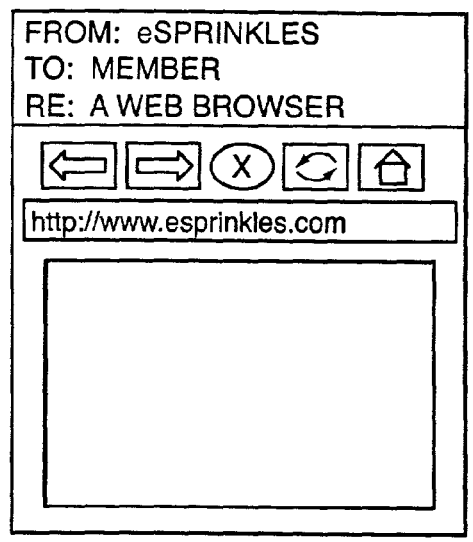
FIG. 14 is an example of a web browser being e-mailed to a recipient according to the present invention.

In FIG. 14, an enhanced e-mail includes a self-executing program which implements a web browser within the e-mail message. The recipient can then browse the Internet with the web browser as he or she would with other web browsers. The URL of the web browser can initially direct the web browser to an advertiser's web site. Certain controls can be disabled such that the web browser can visit only one or a limited number of web sites.

Figure 15:
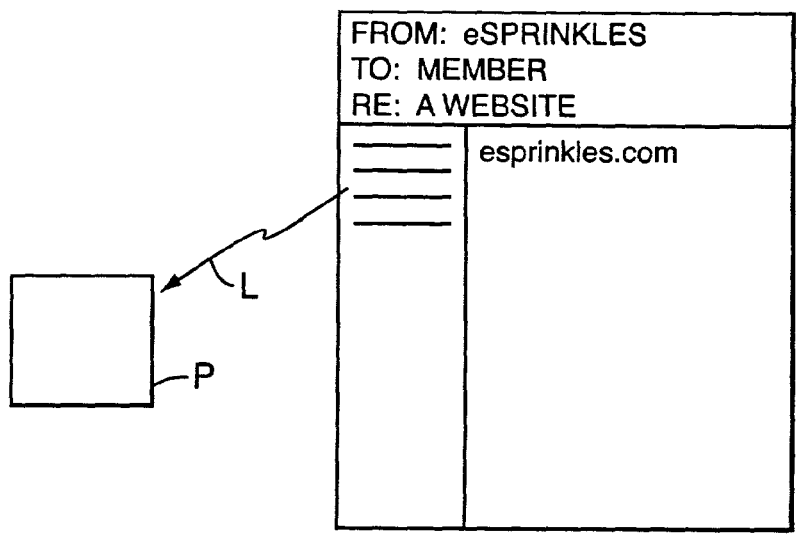
FIG. 15 is an example of at least a portion of a website being e-mailed ("pushed") to a recipient according to the present invention.

In FIG. 15, an enhanced e-mail includes at least a part of a web site that has been e-mailed or "pushed" to a recipient. There is no reason, other than size, why an entire web site cannot be pushed onto a recipient's machine by an enhanced e-mail of the present invention. However, more preferably, certain pages of a web site may by incorporated into the enhanced e-mail message, such that links such as the link L can form hypertext links to web pages, such as web page P, stored elsewhere on the Internet.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A method for providing an audiovisual e-mail system comprising:

providing an e-mail application on a network to a sender;

receiving a message and an audiovisual enhancement from the sender, wherein the audiovisual enhancement is associated with said message, and wherein said message is to be sent as an e-mail to at least one recipient on said network;

associating said message with a programmable enhancement operative to automatically stream said audiovisual enhancement, at least in part, from said server over said network upon the opening of said e-mail and to display said audiovisual enhancement within said e-mail in conjunction with said message without the requirement of a previously installed viewer in such a manner that other content of said e-mail which is intended to be viewed is not visually obscured; and sending said e-mail over said network to said at least one recipient.

2. A method as recited in claim 1 wherein said audiovisual enhancement includes both audio and visual components.

3. A method as recited in claim 1 wherein said audiovisual enhancement includes only an audio component.

4. A method as recited in claim 1 wherein said audiovisual enhancement includes only a visual component.

5. A method as recited in claim 1 wherein said audiovisual enhancement includes a streaming video displayed within a window of a recipient's machine.

6. A method as recited in claim 1 wherein said audiovisual enhancement is developed on a sender's machine, and is transmitted to said server over said network.

7. A method as recited in claim 6 wherein said network includes a TCP/IP network.

8. A method as recited in claim 7 wherein said network includes the Internet.

9. Computer program code stored on a non-transitory computer readable media to provide an audiovisual e-mail system comprising:

program code for transmitting over a network to a server an audiovisual enhancement which is associated with a message from a sender, said message to be sent as an e-mail to at least one recipient on said network; and program code for associating said message with a programmable enhancement operative to automatically stream said audiovisual enhancement, at least in part, from said server over said network and to display said audiovisual enhancement within said email in conjunction with said message upon the selection of said message by said at least one recipient without the requirement of a previously installed viewer in such a manner that other content of said e-mail which is intended to be viewed is not visually obscured.

10. Computer program code stored on a non-transitory computer readable media to provide an audiovisual e-mail system as recited in claim 9 wherein said audiovisual enhancement includes both audio and visual components.

11. Computer program code stored on a non-transitory computer readable media to provide an audiovisual e-mail system as recited in claim 9 wherein said audiovisual enhancement includes only an audio component.

12. Computer program code stored on a non-transitory computer readable media to provide an audiovisual e-mail system as recited in claim 9 wherein said audiovisual enhancement includes only a visual component.

13. Computer program code stored on a non-transitory computer readable media to provide an audiovisual e-mail system as recited in claim 9 wherein said audiovisual enhancement includes a streaming video displayed within a window of said recipient's machine.

14. Computer program code stored on a non-transitory computer readable media to provide an audiovisual e-mail system as recited in claim 9 wherein said audiovisual enhancement is developed on a sender's machine.

15. An audiovisual e-mail system comprising:

means transmitting over a network to a server from a sender machine an audiovisual enhancement which is associated with a message from said sender, said message to be sent as an e-mail to at least one recipient on said network; and means associating said message with a programmable enhancement operative to stream said audiovisual enhancement, at least in part, from said server over said network and to display said audiovisual enhancement in conjunction with said message on a recipient machine upon the selection of said message by said at least one recipient in such a manner that other content of the e-mail which is intended to be viewed is not visually obscured.

16. An audiovisual e-mail system as recited in claim 15 wherein said audiovisual enhancement includes both audio and visual components.

17. An audiovisual e-mail system as recited in claim 15 wherein said audiovisual enhancement includes only an audio component.

18. An audiovisual e-mail system as recited in claim 15 wherein said audiovisual enhancement includes only a visual component.

19. An audiovisual e-mail system as recited in claim 15 wherein said audiovisual enhancement includes a streaming video displayed within a window of said recipient's machine.

20. An audiovisual e-mail system as recited in claim 15 wherein said audiovisual enhancement is developed on said sender's machine.

21. A method for providing e-mail comprising:

providing a link between an open e-mail on a recipient computer and a stored audio and/or video file not on said recipient computer; and streaming said audio and/or video file to said recipient computer for display within said open e-mail in such a manner that other content of said e-mail which is intended to be viewed is not visually obscured.

22. A computer program stored on a non-transitory, computer-readable media for providing e-mail comprising:

software segments providing a link between an open e-mail on a recipient computer and a stored audio and/or video file not on said recipient computer; and software segments streaming said audio and/or video file to said recipient computer for display within said open e-mail in such a manner that other content of said e-mail which is intended to be viewed is not visually obscured.

\* \* \* \* \*